United States Patent [19]
Chin et al.

[11] Patent Number: 5,787,283
[45] Date of Patent: Jul. 28, 1998

[54] FRAMEWORK FOR MANUFACTURING LOGISTICS DECISION SUPPORT

[75] Inventors: Goodwin R. Chin, Palo Alto, Calif.; Walter C. Dietrich, Jr., Yorktown Heights, N.Y.; Thomas Robert Ervolina, Hopewell Junction, N.Y.; John Peter Fasano, Briarcliff Manor, N.Y.; Elizabeth Jodi Poole, Garrison, N.Y.; Jung-Mu Tang, South Salem, N.Y.

[73] Assignee: International Business Machines Corporation, Armonk, N.Y.

[21] Appl. No.: 549,591

[22] Filed: Oct. 27, 1995

[51] Int. Cl.⁶ .................................................. G06F 17/60
[52] U.S. Cl. .................... 395/701; 395/705; 395/703; 395/919; 395/925; 395/920; 395/54; 395/60; 395/62; 364/468.03; 364/468.05; 364/468.02; 364/468.01; 364/468.06; 364/468.09; 364/468.1; 364/578; 364/921.4; 364/916.3; 705/8; 705/9; 705/7; 705/10; 707/103; 707/104
[58] Field of Search ...................... 395/701–710, 395/919, 920, 925, 10, 12, 50, 54, 60, 62, 68, 75–77; 364/468.01–468.09, 468.1, 578, 282.1, 221.2, 221.9, 280.4, 916.3, 912.4; 705/7, 8, 10, 1; 707/103, 104, 100

[56] References Cited

U.S. PATENT DOCUMENTS

| | | | |
|---|---|---|---|
| 5,089,970 | 2/1992 | Lee et al. | 364/468.02 |
| 5,216,593 | 6/1993 | Dietrich et al. | 364/468.09 |
| 5,369,570 | 11/1994 | Parad | 364/468.05 |
| 5,450,317 | 9/1995 | Lu et al. | 705/10 |
| 5,463,555 | 10/1995 | Ward et al. | 364/468.02 |
| 5,479,343 | 12/1995 | Matoba et al. | 364/468.13 |
| 5,548,518 | 8/1996 | Dietrich et al. | 364/486.06 |
| 5,630,070 | 5/1997 | Dietrich et al. | 705/8 |
| 5,649,113 | 7/1997 | Zhu et al. | 705/7 |

OTHER PUBLICATIONS

"Systems Integration Report: Integrated Plant Floor Management Software Shows Considerable Promise", Manufacturing Automation, p. N/A, May 1993.
IBM Production Resource Manager, Release 4 User's Guide and Reference.
Optimization Subroutine Library, Guide and Reference.
Chesapeake Decision Sciences, Inc. Mimi p. 4.
Macsyma® 2.2.
Linpack.
Design Patterns.

*Primary Examiner*—Emanuel Todd Voeltz
*Assistant Examiner*—Tuan Q. Dam
*Attorney, Agent, or Firm*—Stephen C. Kaufman

[57] ABSTRACT

A tool including a framework suitable for manufacturing logistics decision support. The tool comprises means for providing an object-oriented technology framework, the framework comprising: means for defining objects representing manufacturing logistics problems; means for transforming a subject of the above objects into representations commonly used in a mathematical solver, wherein the representations in the solver have predefined relationships based on their properties; and, means responsive to selective changes in the objects for modifying the behavior of the framework for developing anew manufacturing logistics decision support application.

7 Claims, 7 Drawing Sheets

FRAMEWORK FOR MANUFACTURING LOGISTICS DECISION SUPPORT

FIELD OF THE INVENTION

The present invention addresses the following situation.

When planners solve difficult manufacturing logistics problems, they frequently use decision support software. The data this software uses may come from many different sources, depending on the environment where the decisions are being made. Techniques for synthesizing the input information and communicating the solution depend on the problems being solved and the users' business processes. This leads to a need for many diverse and unique software application programs. This invention discloses a novel tool and methodology for developing quickly and easily these unique software application programs from a framework of reusable software parts.

BACKGROUND OF THE INVENTION

Developing a "Manufacturing Logistic Decision Support Software" application is a labor-intensive and costly endeavor. This is because of the many unique requirements of any particular manufacturing concern, even though there are many underlying similarities among manufacturers.

Manufacturing Information Systems (MISs) are systems that contain data and data processing methods that aid manufacturing managers in production planning and execution. For example, an MIS typically contains demand data, supply data, cost data, and bill-of-material data, and may include Manufacturing Resource Planning (MRP) software, Capacity Requirements Planning (CRP) software, order tracking software, and financial reporting software. ERP (Enterprise Resource Planning) systems, MRP systems, and CRP systems are types of MISs. There are hundreds of MIS vendors; no single company has a significant market share. In addition, many major manufacturers have built their own internal systems that include much of the function available in commercial MISs. There is no agreed-upon set of standards for data representation or interfaces with MISs. Many MIS vendors consider their data representations proprietary. MIS software is available for virtually every possible configuration of computer hardware, from mainframes to personal computers.

An MIS is primarily a data management system. Most important manufacturing decisions (e.g., what to make, how much to make, when and where to make it) are still ultimately made by humans. Businesses can be run more profitably if this data is used by computer programs that do mathematical analysis. To do this quickly and efficiently, two problems must be overcome; the applications must be easier to develop, and the interfaces to the MISs must be efficient and easier to develop.

One business area particularly amenable to computerized applications of mathematical techniques is production planning. Typically, a manufacturing manager uses experience together with knowledge about manufacturing capacity and market demand to determine an initial production plan. Then MRP and/or CRP are run to produce lists of inconsistencies between the production plan and the resource availability. The manager must then either revise the production plan and run MRP and CRP again, or find some way of resolving the shortages. However, executing MRP and CRP can be time consuming. The exception reports can be very long (thousands of part numbers, dozens of time periods), and it is difficult to extract information on now the production plan should be changed (for example, which end products are affected by a particular material shortage). Consequently, at most a few revisions are considered, and the final production plans may be inconsistent with resource availability. Attempting to execute an infeasible production plan can result in missed customer shipments, excess raw material inventory ("unmatched" parts), long cycles times, production bottlenecks, poorly utilized capacity, and idle workers. Even when the production plan is feasible, the process of manually revising the production plan until MRP and CRP indicate no shortages, can result in poor resource allocation decisions, such as allocation of scarce resources to low-profit products. Software that processes all the relevant data and uses mathematical techniques (such as optimization and heuristics) to determine optimal, feasible production plans can save millions of dollars for manufacturers.

Many programs that use mathematical or algorithmic techniques to solve manufacturing resource allocation problems exist. They frequently are in the form of subroutine libraries.

Applications of such programs require the design and implementation of sophisticated heuristic or mathematical algorithms;

an understanding of information about manufacturing logistics, including bills of material, supply streams, demand streams, lead times, resource usage, production yields, procurement policies, and financial information;

interfaces to the MIS, where the data come from and, when the user is satisfied with the software's result, where the output goes; and user interfaces that can be understood by employees in manufacturing environments.

SUMMARY OF THE INVENTION

We have recognized that in the past, such applications have been written stand-alone, and then integrated with one or more uses' MISs. Except for the reuse of libraries such as Workstation Implosion(TM) Tool(WIT), Optimization Subroutine Library (OSL), or MIMI(TM), each application's design and programming has been separate and unique. In addition, customizing or extending these applications in order to satisfy current users or meet the needs of prospective users has been difficult and time-consuming, or has used inefficient file-based interfaces. Our invention addresses these problems, and solves them by way of a novel methodology and tool to be disclosed below.

As prelude to reciting and summarizing the novel tool, we first develop a paradigm for the purposes of pedagogy, as expressed by what we henceforth call "The Analytic Farmer" parable.

The Analytic Farmer

This invention and its advantages over prior art are presented through a parable about a farmer who uses math and a calculator to solve farming problems. An analogy is drawn between the parable and the invention.

The Seed Problem The farmer has to figure out how much seed to buy. He thinks of a model of this problem that he can solve using algebra. Because the farmer has a lot of experience with farming problems, he has already made formulas that relate to the geometric entities and the units typically associated with farms (such as rectangles and acres). He is able to find a correct formulation for his seed purchase question quickly by using his existing data (size in acres of field to be seeded), his new data (pounds of seed per acre) and his existing algebraic formula (pounds per are * acres=pounds needed).

The Watering Problem The farmer has another problem. "How long should I water the field, given even distribution of water and a certain flow rate?" He translates this into a model that he can solve using algebra.

The Foreign Farm's Problem A foreign farmer asks the first farmer to figure out how much seed she needs for her foreign farm, but she uses a different language, and different measures—metric instead of English. Before creating an algebraic model, our first farmer translates her language and units into his own. After using his own formulas and algebraic algorithms to get the solution, he translates the numeric solution into a solution in his own units, and then translates them into the foreign farmer's units and translates the solution from his own language into her language. He does this extra work because he does not have formulas that apply to foreign measures directly and because the foreign framer will be able to use the solution only if she understands it.

The Silo Problem The farmer has another problem. "How can I minimize the cost of building a silo to store my seed?", where he knows the cost of the roofing, siding, and flooring material, and the volume of space necessary to store the seed. Although the problem can be expressed using formulas 'similar' to the formulas for the previous problems, expressing it completely and solving it requires calculus.

When our first farmer started his career, he used basic textbooks on geometry, algebra, and calculus to solve problems like these. When he had a problem, he would search for the relevant formulas. One day, he realized that he could write the most important formulas down on a piece of paper. Some of these formulas were in textbooks, others were derived from textbook formulas but arose frequently in his farming problems. Using the rules of algebra, he could combine the formulas to express most problems that occurred in farming (his domain), and using the solution techniques of algebra and calculus, he could solve the problems. He also realized that using his formulas would be less error-prone if he included the variables' units of measure (such as inches or bushels) on the sheet.

His insight was that, if he summarized the mathematical formulas relevant to farming on one sheet of paper, he could use them to solve many farming problems more quickly and easily, with less chance of error.

This invention is analogous to the parable because it provides—in a reusable way—the essential things needed to both design and implement manufacturing logistics decision support applications. Although there may have been previous attempts to make this process simpler, this is the first one that has been successful. The following section explains this analogy in more detail.

The Farmer's Formulas and the Manufacturing Logistics Framework

This overview describes the relationship—the analogy—between the farmer parable and the invention.

The farmer is like an analyst-programmer, and the farmer's sheet of farming formulas corresponds to that part of this invention that we refer to as the Scenario subsystem of the Logistics Framework. Both the farmer and the analyst-programmer have to figure out how to translate their real-world problems into a model amenable to computational solution. In addition, the analyst-programmer has to implement a software program that can be reused to solve the problem without her presence. The formulas make the farmer's job easier, and the Logistics Framework makes the analyst-programmer's job easier. The Logistics Framework does this by providing a pre-defined architecture and set of predefined objects that let the analyst-programmer implement an application more easily.

Just as the framer's formulas make it easier to solve entirely different problems (such as the seen problem and the water problem), the Logistics Framework makes it easier for the analyst-programmer to implement different Manufacturing Logistics applications quickly.

Just as the farmer assisting the foreign farmer requires a translation into units of measure that are not native to his system, an analyst-programmer may have to accommodate different MISs. This invention allows the MISs to be decoupled from the mapping from real-word problems to mathematical problems using Data Interfaces (DIFs). Compared to prior art, this invention has the advantage that it does not require the data in MISs to be converted into some lingua franca—some specific, predefined file format—before the problem can be solved. This saves computational time and space, since the application program saves a step in the chain MIS <—> predefined file format <—> model. DIFs let the analyst go directly from MIS to model and back.

Just as the framer building a silo requires a system that can do calculus as well as a system that can do algebra, an analyst-programmer may require different solvers to accommodate the different manipulations her problem demands.

Restated, the prior art is not able to articulate, much less solve, the type of problem inherent in the farmer paradigm. There are no structural capabilities in the prior art to pose problems of the type implicit in the farmer paradigm, much less integrate or solve them as a composite whole. The reasons for this are the following:

1. The prior art does not provide a formula mechanism for reusing the design insights and system designs of experienced software engineers. This invention, in sharp contrast, lets an analyst-programmer take a system that was built by a knowledgeable and skilled designer—a system that has been proven and improved over time—and extend it for their application. Although object-oriented frameworks (sets of classes designed to work together to capture domain knowledge) are prior art, they have never been applied to Manufacturing Logistics in a way contemplated by the present invention.

2. The prior art does not provide a good way to reuse code. Except for large systems (such as operating systems (e.g., Microscof's Windows 3.1, Unix) and data bases (e.g., IBM's DB2)) and specialized programs (such as mathematical subroutine libraries (e.g., LINPACK)), software previously developed has rarely been reused successfully. This invention promotes and facilitates the reuse of the code that is in the invention, whereas, the prior art moots this problem, but does not solve it.

3. The prior art has no efficient way of separating applications from this MIS interfaces. In contrast, they use a file-based interface, which is inefficient, or a custom interface for each application.

Having just articulated, for the sake of pedagogy and prelude, the farmer parable as illustrative of the invention in its broadest aspects, we now disclose, in its first aspect, a novel tool comprising:

(1) means for providing an object-oriented technology framework, the framework comprising:
   (i) means for defining objects representing manufacturing logistics problems; and
   (ii) means for transforming a subset of the above objects into representations commonly used in mathematical solvers, wherein the representations in the solver have predefined relationships based on their properties; and (2) means responsive to selective changes in the objects for modifying the behavior of the framework for developing a new manufacturing logistics decision support application.

In a second aspect, the present invention comprises a program storage device readable by a machine, tangibly embodying a program of instructions executable by the machine to perform method steps comprising:

(1) providing an object-oriented technology framework, the framework comprising:
   (i) means for defining objects representing manufacturing logistics problems; and
   (ii) means for transforming a subject of the above objects into representations commonly used in mathematical solvers, wherein the representations in the solver have predetermined relationships based on their properties; and
(2) responding to selective changes in the objects for modifying the behavior of the framework for developing a new manufacturing logistics decision support application.

The novelty of the present invention has just been defined. The advantages of the invention are manifold, and include the following:

Using the invention, applications that address different business problems can be developed with less programming effort, hence more quickly and at lower cost.

Compared to developing applications that have custom interfaces to an MIS (prior art), sets of applications that use the invention can interface to the same MIS more quickly and at lower cost.

Compared to applications that use a file-based interface for one or more MISs (prior art), applications can access the MIS more efficiently and more flexibly.

Compared to applications that use a fill-based interface for one or more MISs (prior art), applications that need data not in the existing interface file format can be developed 1. without requiring a new file format, and
2. without requiring modifications of the old application to use a new file format.

Compared to applications developed using prior art, new applications can be developed with less programming by reusing previously-developed high-quality code, so that the resulting programs are of higher quality.

New application developers can reuse the architecture of the framework so that they spend less time developing applications and get higher-quality results.

BRIEF DESCRIPTION OF THE DRAWINGS

This invention is illustrated in the accompanying drawings, in which.

THE INVENTION

DETAILED DESCRIPTION OF THE INVENTION

The detailed description of the invention is developed by first disclosing preferred details and concepts embedded in the invention as summarized above.

Means for defining objects: By "means for defining objects", we preferably means using object-oriented analysis and design to define and implement objects and/or classes. Object-oriented analysis and design is described in many books, including Meyer (1988), Wirfs-Brock (1990), Brooch (1991), Jacobson (1992), and Taylor (1990) (Object Oriented Technology: A Manager's Guide. Object-oriented design usually leads to the development of objects or classes that correspond to important nouns in the domain of the application. For example, if the application is one that helps manufacturing planners decide what to make, there will probably be objects for parts (or materials) and for demands (such as orders from customers or forecasted orders). If the application is one that helps farmers decide how much seed to buy, there might be objects for fields and seeds. Good object-oriented designs frequently separate the creation and initialization of objects from the objects themselves, so there might be objects whose purpose is to read in data and set up the objects needed to run an application.

Representing: "Representing" preferably means "serving as a sign or symbol of" (Webster's 7th). In other words, providing data and operations on a computer that symbolize the relevant entities and actions in the domain being represented.

Representing Manufacturing Logistics Problems: Once we known what is means to represent something on a computer, we need to known what "representing manufacturing logistics problems" means.

"Manufacturing logistics problem" preferably means a problem in the manufacturing logistics area of manufacturing businesses that may be amenable to solution by mathematical or algorithmic techniques. This covers a broad range of problems. There are many examples:

What do I need to order to build all of my demands? This question can be answered by traditional "explode and net" calculations as described in MRP textbooks and the APICS literature.

What should I build on a certain assembly line today and when should I build each subassembly? This can be answered by traditional finite capacity schedulers as described in APICS literature.

What should I plan to build if I can't get all of the material or if I won't have all of the capacity I need? This can be answered, with varying degrees of optimality and efficiency, by a variety of techniques, including linear-programming, rule-based systems, constraint-programming, and possibly genetic algorithms.

What should my multi-site company build at each of the interrelated plants in order to meet objectives such as maximal profit or minimal late deliveries? There are a variety of techniques for addressing this problem, but it is still an active Research and Development area.

What should I order if my suppliers are not completely reliable or if my forecast orders are not certain to materialize? This is important because you do not want to carry excess inventory, but you do not want to deliver products late to your customers. There are techniques for solving this problem, but it is also an area that has room for innovation.

What should I build and promote (in the marketplace) in order to work down my inventory? This problem (excess inventory) can result from a variety of circumstances, but it is bad because carrying it costs money. This problem can be solved using linear programming.

Should I build a new plant, and how big should it be to satisfy my customers without assuming undesirable levels of risk? This question depends on product mix, order volatility, cost of capital, and other factors.

These problems all have to do with allocating resources, whether to one line or to all of the plants in a large company or set of companies. The planning horizons can be very short (a day) to long (three years or more).

Therefore, "representing manufacturing problems" preferably means providing data and operations that symbolize logistics problems that occur in manufacturing businesses so that solutions to the problems can be found.

Mathematical Solvers: A mathematical solver preferably is anything that manipulates symbols in a mechanical/automatic way using a mathematical or algorithmic technique in order to find answers to problems represented by configurations of those symbols. Samples solvers include:

- a calculator that solves arithmetic problems (the symbols are push-buttons and numerals on a character display);
- a computer executing a program such as MACSYMA that does symbolic algebra to simplify complex expressions (the symbols include variables, numbers, operations, and relations (such as equality));
- a computer executing a linear programming subroutine library such as LINPACK (the symbols include numbers representing coefficients in matrices and vectors and function names representing operations to perform on the symbols, such as matrix multiplications);
- a computer executing an implosion(TM) program such as WIT (the symbols include numbers and data type instances (such as character strings and enumerators) representing attributes that are important in implosion (TM);
- a computer executing a genetic algorithm to find the smallest rectangle of cloth that can be cut into the shapes required to make a pair of pants (the symbols include rectangles, polygons, chromosomes, and numbers representing probabilities of mutation); or
- a computer executing a constraint-based or rule-based algorithm for finite-capacity scheduling (the symbols may include constraints or rules about permissible sequences of production operations, numbers representing the time required to set up a machine when theitem being manufacturing on the machine is changed, and numbers representing the desired production).

A solver can be electrical, mechanical, electronic, or of any other technology capable of manipulating symbols accurately.

Representations commonly used in mathematical solvers: Representations commonly used in mathematical solvers preferably include arrays of numbers in computer memory, arguments in parameter lists for ApplicationProgramming Interfaces (API's), and characters or numbers in files. When using a solver, you have to interface to it using the facilities it provides, whether is provides a file-based interface, an API, or something else.

Means for Transforming a Subset of the above objects: Some of the objects that preresent the manufacturing problem may not be relevant to the mathematical solver. For example, objects that are used to group output in a way that is pleasing for the user probably do not affect the mathematical solution. Other objects do affect the solution. These objects (a subset of the objects) contain data that should be given to the solver. The way you give data to the solver depends on the solver being used. Techniques used include (a) writing the data into a file a solver reads and (b) making calls toa solver's API. Output from the solver must be reflected in objects. The way this is done also depends on the solver being used and can include (a) reading data from a file a solver produces and (b) using a solver's API to get results. Operations on the objects also have to be transformed into operations inthe solver. Ways to do this include (g) generating control files for solvers and running the solvers as batch job and (b) calling API functions that cause the solvers to do operations (such as matric multiplication or simulation of evolution). "Transforming a subset of the above objects into representations commonly used in mathematical solvers" preferably means converting the relevant objects' relevant attributes into the representations of the solver (or solvers) being used, converting method invocations or member function calls that can operate on the objects into invocations of the solver or solvers algorithms, and converting output from the solver in changes in the relevant objects' relevant attributes.

Manufacturing Logistics Decision Support Application: Recall the description of "manufacturing logistics problem" from section "Representing Manufacturing Logistics Problems" on page 13 above. A "manufacturing logistics decision support application" is a computer program that preferably helps one or more users solve one or more manufacturing logistics problems. The application may be used interactively or it may run automatically and only notify the user(s) if something unusual occurred. The results of the application's execution may be sent to other applications or to MISs automatically or the user(s) my have to decide whether to send the results to other systems. (It may even be up to the user to transfer the results to another system manually.) A manufacturing logistics decision support application, then, is any of a large variety of programs that apply mathematical or algorithmic techniques to help a business's employees solve manufacturing logistics problems.

Developing a new manufacturing logistics decision support application: Developing a new manufacturing logistics decision support application preferably means:

1. analyzing a manufacturing logistics problem in order to
   a. gain a thorough understanding of the business problem;
   b. create a model of the problem that is amenable to mathematical or algorithmic solution;
   c. understand the sources of the data that are needed to solve the problem;
   d. define mappings that transform the real world problem and the relevant data into representations that can be manipulated to solve the problem;
   e. define mappings that take the model's solution into a solution in the real world;
2. designing an application that
   a. represents the above models and mappings;
   b. takes into account the needs of the user(s) to control the application and manipulate the input and the output; and
   c. is efficient enough to solve the manufacturing problem when the users need a solution, using hardware that the manufacturing organization can afford;
3. implementing the application as designed above so that it is able to take the user(s) data from the appropriate sources and optionally put results into the appropriate applications or systems, optionally allow the user(s) to modify the input and the output, and solve the user's (users') problem.

These 3 steps may be done as sequence or may be done iteratively by doing some analysis, some design, and some implementation and then repeating the three steps so that things learned in a subsequent step can be used to improve a previous step's result. Hybrids of the purely sequential and iterative schemes can be used. Two steps may be done at the same time. Other steps may also be used in the process, such as unit testing and user testing, but these are the essential three steps needed to develop a new manufacturing logistics decision support algorithm.

We have just disclosed the detailed description of the invention by elaborating preferred concepts and phrases of the invention in its broadest manifestation. We now turn our attention to one illustrative and preferred specific embodiment of the invention. We return to our running example of the Analytic Farmer, for reasons of clarity and predagogy.

The Farmer's Formulas and the Manufacturing Logistics Framework

This overview describes the relationship—the analogy—between the farmer parable and the invention. This a repeat of the overview previously given. Details of the invention are in "The Manufacturing Logistics Framework" on page 23.

The farmer is like an analyst-programmer, and the framer's sheet of farming formulas corresponds to that part of this invention that we refer to as the Scenario subsystem of the Logistics Framework. Both the farmer and the analyst-programmer have to figure out how to translate their real-world problems into a model amenable to computational solution. In addition, the analyst-programmer has to implement a software program that can be reused to solve the problem without her presence. The formulas make the farmer's job easier and the Logistics Framework makes the analyst-programmer's job easier. The Logistics Framework does this by providing a pre-defined architecture and set of predefined objects that let the analyst-programmer implement an application more easily.

Just as the farmer's formulas make it easier to solve entirely different problems (such as the seed problem and the water problem), the Logistics Framework makes it easier for the analyst-programmer to implement different Manufacturing Logistics applications quickly.

Just as the farmer assisting the foreign farmer requires a translation into units of measure that are not native to his system, an analyst-programmer may have to accommodate different MISs. This invention allows the MISs to be decoupled from the mapping from real-world problems to mathematical problems through the use of the invention's DIPs. Compared to prior art, this invention has the advantage that is does not require the data in MISs to be converted into some lingua franca—some specific, predefined file format—before the problem can be solved. This saves computational time and space, since the application program saves a step in the chain MIS <—> predefined file format <—> model. DIFs let the analyst go directly between MIS and model.

Just as the farmer building a silo requires a system that can do calculus as well as a system that can do algebra, an analyst-programmer may required different solvers to accommodate the different manipulations her problem demands.

Models of the Domains of Discourse

Figure 1:
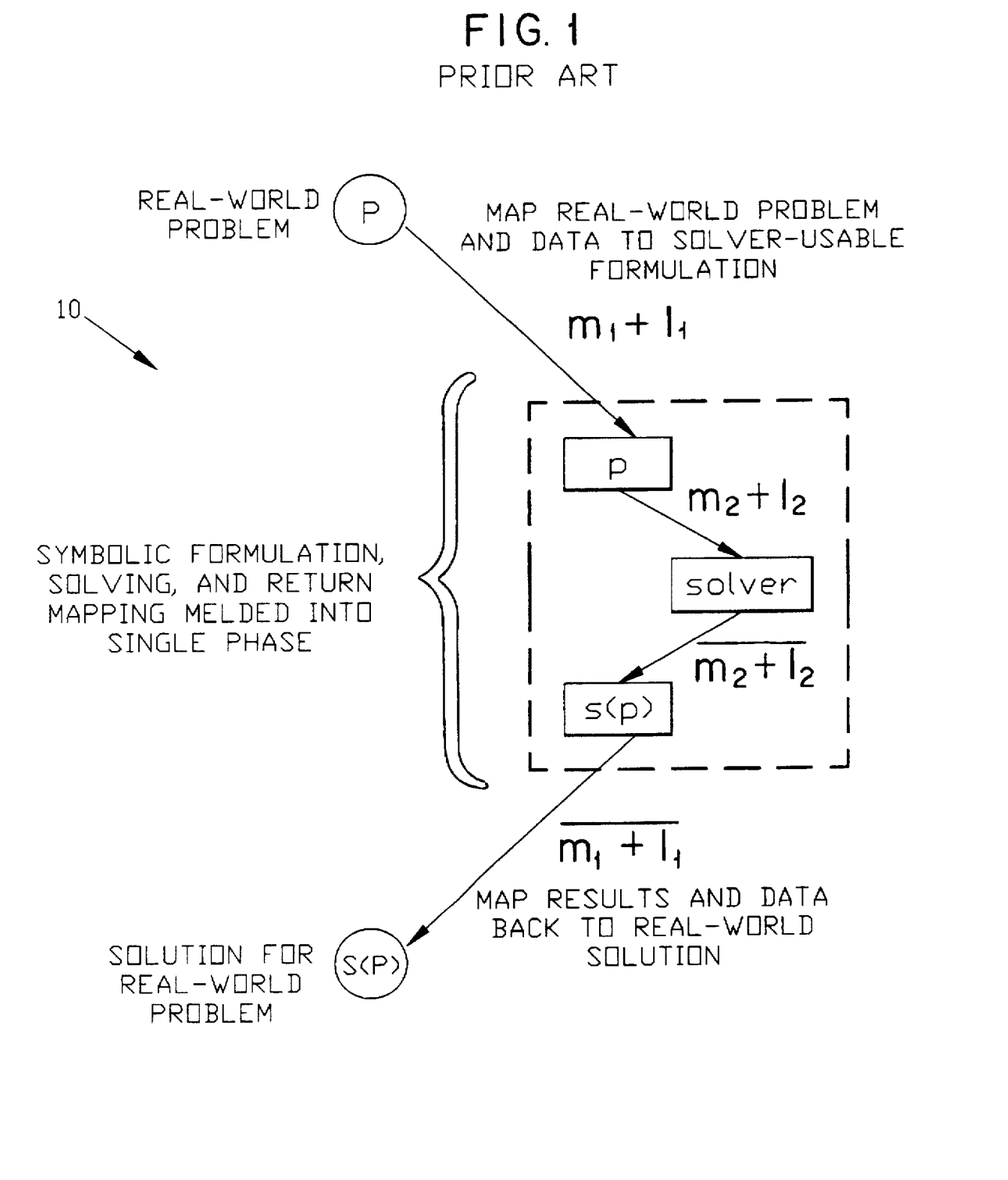
FIG. 1 shows the prior art (general)

The analyst-programmer has a model of the process she uses to develop and deploy applications. Most of this model may nominally be prior art: The framework and the user of it are the invention. There is also a model of the process the farmer uses to solve problems. In order to explain this invention, we compare the two models. The model shown in FIG. 1, numeral 10, is a very general illustrative model for solving real-world problems using mathematical techniques. It contains the following symbols:

P Let P represent a problem as it exists in the real world, in human language and human units of measurement concerning physical entities, durations, questions, and instructions.

$m_1$ Let $m_1$ represent a function that maps problem P into a symbolic formulation.

p Let p represent the symbolic formulation of problem P. p is usually an abstraction that represents the parts of P that are important when finding a solution to P. The detail and accuracy with which p represents P depends on P and $m_1$. p generally uses a subset of the equations and formulas which the domain-specific knowledge comprises.

$m_2$ Let $m_2$ represent a function that converts symbolic formulation p into a unitless formulation usable by the solver. This solver-usable formulation can be in the form of electrical pulses, flashes of light, mechanical clicks of a cog, or any other medium capable of producing distinguishable signals.

$I_1$ Let $I_1$ represent a function that translate human quantifications used in the real world problem P into symbolic notation consistent with the notation of p.

$I_2$ Let $I_2$ represent a function that translates from the notation of p into symbolic notation usable by solver s.

I This system is not in the "Prior Art" model but is used in another model. Let I represent a function that translates human quantifications used in the real world problem P into symbolic notion usable by a solver that will manipulate them.

s Let s represent a machine that can manipulate symbols in order to find answers to problems represented by configurations of those symbols. Sample solvers include a calculator that solves arithmetic problems (the symbols are push-buttons and numerals on a character display) and a computer executing a program that does symbolic algebra to simplify complex expressions. A solver can be electrical, mechanical, electronic, or any other technology capable of manipulating symbols accurately. $\overline{I_2}$ Let $\overline{I_2}$ represent a function that translates those symbolic representations of numeric quantities generated by s into quantifications in the domain of s(p). $\overline{I_1}$ Let $\overline{I_1}$ represent a function that translates quantifications in the domain of s(p) into quantifications that humans can understand and use. $\overline{I}$ Let $\overline{I}$ represent a function that translates those symbolic representations of numeric quantities generated by the solver back into quantifications that humans can understand and use. $\overline{m_2}$ Let $\overline{m_2}$ represent a function that converts the unitless solver-generated signals back into a symbolic formulation s(p) of the solution to the problem p. s(p) Let s(p) represent a symbolic formulation of the solution to problem p. $\overline{m_1}$ Let $\overline{m_1}$ represent a function that maps symbolic solution s(p) into S(P). S(P) Let S(P) represent a solution, in real-world terms, of the problem P.

Figure 2:
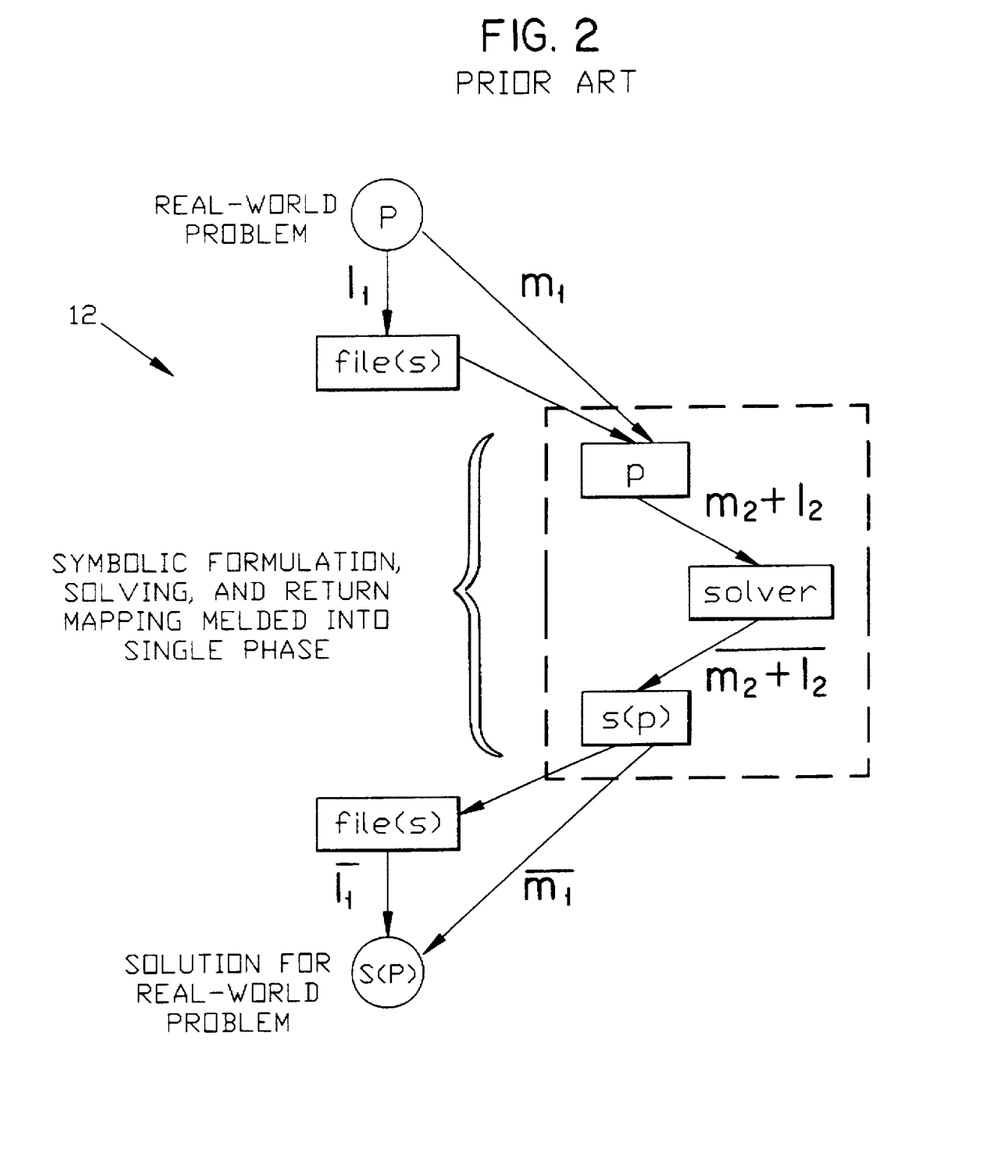
FIG. 2 shows the prior art (manufacturing logistics)

FIG. 1 shows this model for solving real-world problems. FIG. 2, numeral 12, shows a very similar model that applies to solving real-world manufacturing problems. The symbols are the same, but "file(s)" blocks have been added because files are a common data intermediary between P and p.

The Manufacturing Logistics Framework

The framework is now described at three levels of detail. First, we describe it at the least detailed level: level 1.

Level 1—Framework Essentials

This invention can be roughly divided into two main areas. One area supports modeling and application development. The other area supports integration with MISs. Part of the invention is the interface between these two areas.

Modeling and Application Development

The farmer represents p by a set of equations or inequalities and a specification that says which variable or variables must be solved for. The analyst-programmer represents p as a Scenario subclass. Scenario subclass instances represent the data and the programs needed to solve a problem P by using a solver s. If the farmer has to solve the same problem with different numbers, he can use the same set of set of formulas and unknowns. Likewise, two different instances of the same manufacturing problem can be represented using two different instances of one Scenario subclass. The farmer created two different models for the Seed problem and the Water problem. The analyst-programmer creates different subclasses of Scenario to represent different problems. She develops applications using the subclasses.

Figure 3:
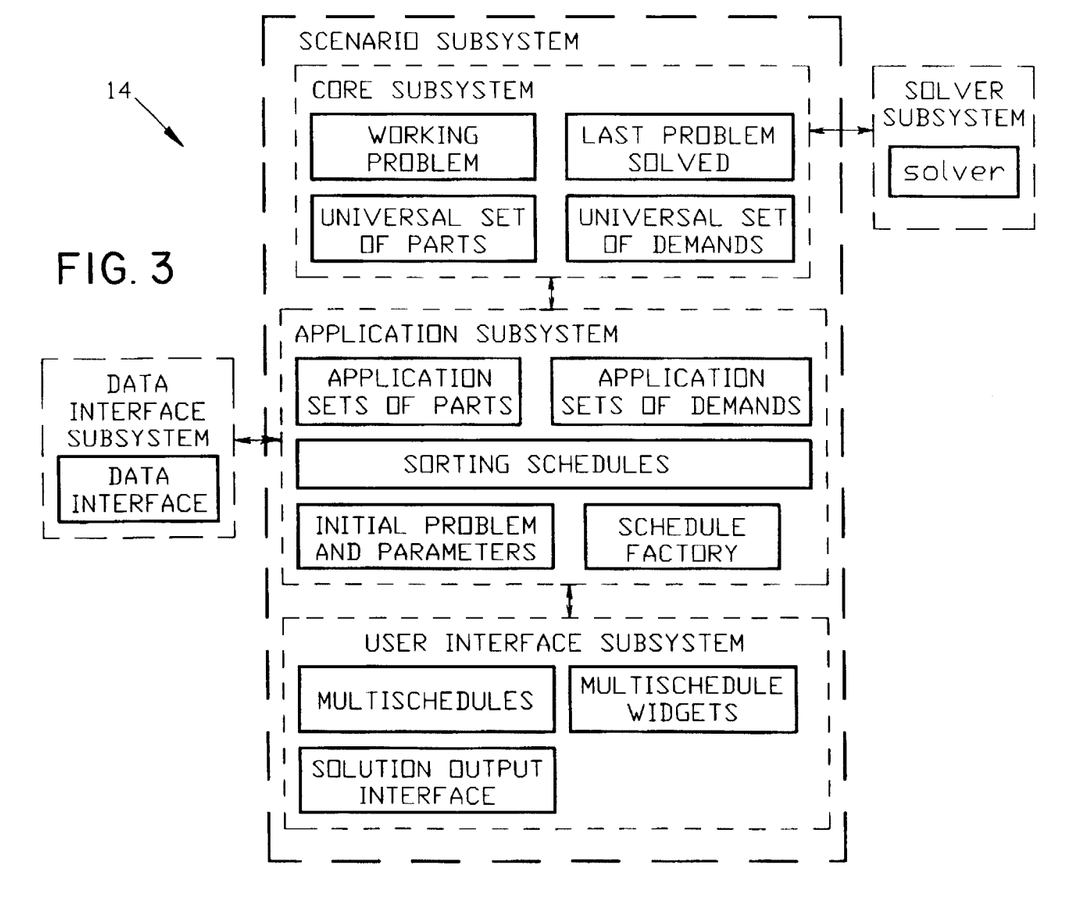
FIG. 3 shows an overview of a Framework.

The Logistics Framework preferably provides a structure for reuse and an architecture that divides both the framework and the development process into understandable pieces. See illustrative FIG. 3, numeral 14. The framework comprises several subsystems. The Data Interface Subsystem preferably is responsible for interfacing with MISs. The Solver Subsystem is not actually part of the framework, but is something that the framework interfaces to. The Core subsystem is responsible for keeping track of low-level data and interfacing to the solver subsystem. The Application Subsystem contains higher-level objects used to build models and applications.

Data Interface Subsystem

Data Interface (DIF) The interface between the framework and an enterprise's MIS system is the responsibility of the DIF. The DIF obtains the domain-specific objects and their attributes from the enterprise. The farmer's world contains entities such as fields and seeds. An attribute of field is the number of acres and an attribute of seed is pounds per acre. The manufacturing world contains entities such as materials and demands (orders). Materials and demands are domain-specific objects. An example of a material attribute is the external supply of a material. The DIF is responsible for responding to requests for the problem's domain-specific objects and their attributes. The DIF must obtain this information from the manufacturing enterprise. This data is usually in an MIS. Because every enterprise may have its own MIS (or its own variation of one or more commercial MISs), the DIF class can be specialized for each enterprise's environment. The DIF class can also be extended to support solving problems which require additional data. DIFs will be explained in more detail in "Extending to Handle Another MIS system" on page 31, infra.

Scenario Subsystem

The Logistics Framework contains both a Scenario class and a Scenario Subsystem. Each Scenario class instance represents one complete manufacturing problem. Because representing all of this is complicated, most of the objects are in a Scenario class instance are in a Subsystem. This subsystems is called the Scenario Subsystem. The Scenario Subsystem contains the Core Subsystems, the Application Subsystem, and the User Interface Subsystem. See FIG. 3.

Core Subsystem: This contains the lowest level classes of the scenario.

Universal Set of Parts (USOP) The Universal Set Of Parts is a collection of all the part objects stored in the system. It is also as a mapping from part names to part objects. (Part objects are used to represent both materials and capacities.)

Universal Set of Demands (USOD) The Universal Set of Demands is a collection of all the demand objects stored in the system. It is also as a mapping from demand names to demand objects.

Last Problem Solved (LPS) This piece contains the most recent problem solution and the inputs used for obtaining this solution. This provides a mechanism for querying the querying the framework about the current solution.

Working Problem (WP) The user may wish to alter some of the data used to solve the problem and then resolve the problem. WP is the repository containing the current and original problem data. This provides the mechanism for determining the changes which have been made to the problem from the time it was originally formulated by IPP. (IPP is described below).

Application Subsystem: The most important responsibilities of this subsystem are to support the modeling required by applications and to provide the application-centric views (as opposed to solver-centric views) of the data needed by the user interface.

Application Set Of Parts (ASOP) An Application Set Of Parts is a collection of parts that the analyst-programmer wants to define for some reason. Each scenario may have 0 or more ASOPs. Each ASOP is a subset of USOP.

Application Set Of Demands (ASOD) An Application Set Of Demands is a collection of demands that the analyst-programmer wants to define for some reason. Each scenario may have 0 or more ASODs. Each ASOD is a subset of USOD.

Sorting Schedules Sorting Schedules are the primary means of communicating information to and from end users of applications built using the framework. Schedules contain information about parts or demands. For example, there is a schedule called the "Demand Schedule" that contains the demand quantity for each demand in the system. For each demand, the demand schedule has an entry that gives the quantity demanded in each period. Compare: SortScheds are able to do everything a conventional Schedule can do, but also provide convenient facilities for reordering themselves using a variety of sort criteria.

Initial Problem and Parameters (IPP) The IPP piece provides a linkage between the solver and the DIF. In order to solve the seed problem, the farmer obtains the field size and seeds per acre data, formulates algebraic expressions for solving the problem, and applies the algebraic solver to the expressions. The watering problem requires an additional field attribute (flow rate) and a different algebraic expression. The farmer sets up different formulas for the two problems, but gets the data from the same source, and applies the same solver to the expressions. When writing an application to solve a manufacturing problem using our framework, the analyst-programmer creates an IPP that both formulates the problem to be solved by the solver and and initializes the objects that model the rear world. The IPP must get the data from a DIF and pass the data to either the solver or other objects which pass the data to the solver.

Schedule Factory The SchedFact exists to make it easier to use SortScheds. The SchedFact is able to create any commonly used SortSched. This allows most analyst-programmers to use the framework without knowing how SortScheds are actually created and initialized.

User Interface Subsystem This subsystem supports the development and implementation of user interfaces for batch and interactive applications. Because most of the application logic is the Application Subsystem, modification of user interfaces is simpler.

MultiSchedules A MultiSchedule contains one or more sets of related schedules. For example, a Part MultiSchedule might contain all parts needed by a specified subassembly, and for each part might include the attributes for quantity required per period, quantity available attribute per period, and backlog quantity per period. The MultiSchedule makes it easier to use the information stored in schedules by combining schedules in different ways and sorting or filtering the combined schedules. For each part or demand in the MultiSchedule, there can be one or more attributes.

MultiSchedule Widgets A MultiSchedule Widget is reusable, configurable, graphic user interface object that provides a spreadsheet-like view into a specified MultiSchedule.

Solution Output Interface The Solution Output Interface makes it easy to write an implosion production schedule, shipment schedule, critical list, and focussed shortage schedule to a file or other output device appropriate to the analyst-programmer's tasks.

Solver Subsystem

The Solver Subsystem can be any engine capable of solving linear programming problems.

Conclusion

Figure 4:
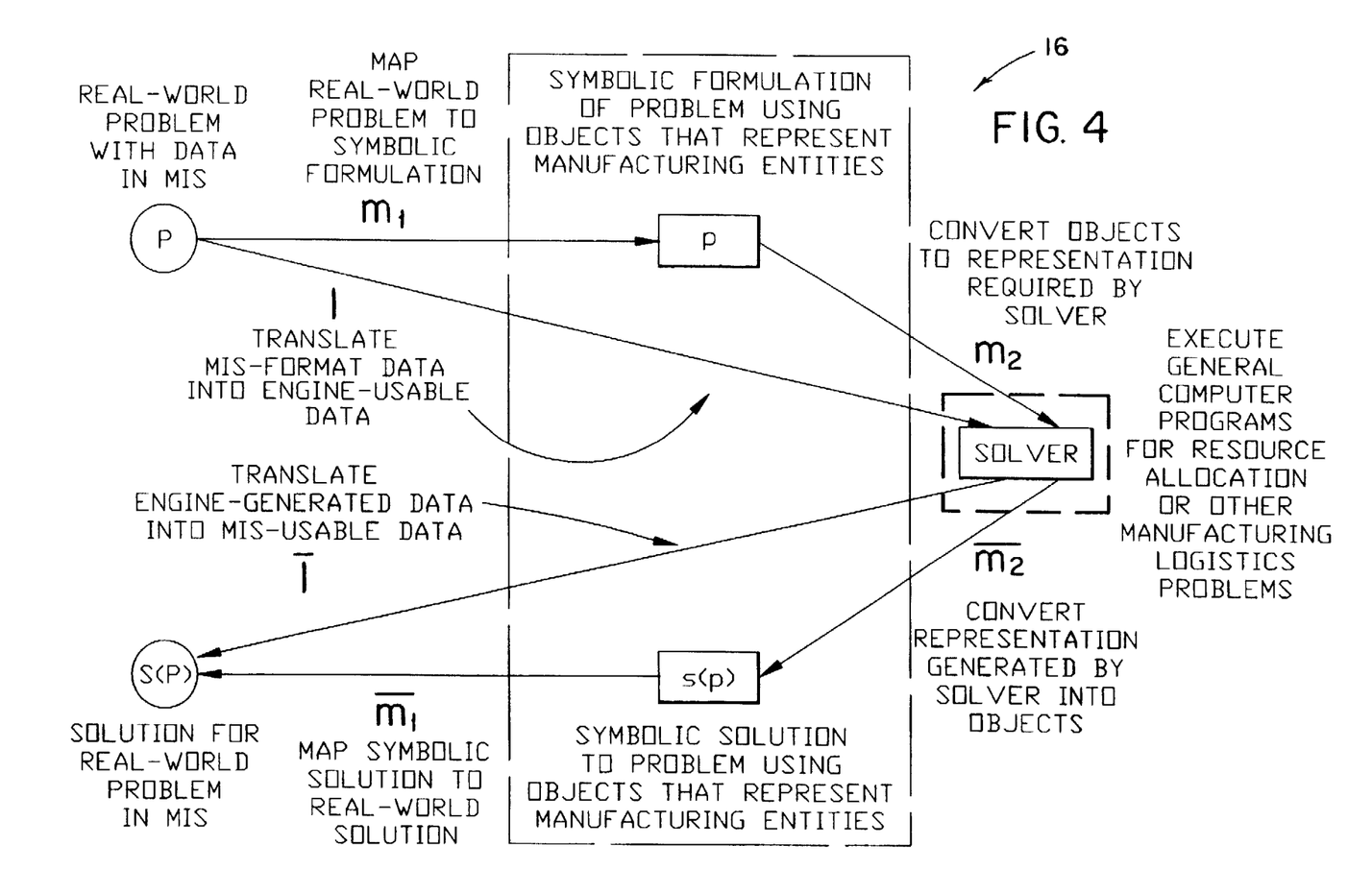
FIG. 4 shows a conceptual overview of the present invention.

In the current state of the art, the multiplicity of manufacturing logistics problems to be solved leads to a multiplicity of custom-built solutions or conversion processes from the language of the user to the terminology used by the decision support tool. This invention provides a DIF which allows the data to be obtained in the terms used by any specific manufacturing enterprise. This allows for the reuse of existing solvers and IPP objects. The invention also provides an IPP, which allows the problem formulation to be separated from the solver and the DIF, which allows existing solvers and DIFs to be reused. The IPP also separates the creation and initialization of the formulation from the manipulation of the formulation that may occur during the execution of a program as the user manipulates the data to arrive at his or her preferred solution. These ideas and distinguishing concepts may also be usefully comprehended by comparing FIG. 2 and FIG. 4, numeral 16. We now describe the framework in more detail and show how to extend it.

Level 2—Extending Framework Essentials

Developing New Applications by Extending the Framework

The Materials Requirements Planning (MRP) (see APICS Dictionary) explosion technique calculates material (part) requirements. Frequently the supply of some parts are constrained, inhibiting the production of the demanded products. When these constraining parts are common among various products, then trade-offs must be made to decide which products are to be produced. The manufacturing scheduler needs to decide what can be built given that some parts are constrained. In addition, the manufacturing scheduler needs to decide when unconstrained parts should be procured. To assist in making these decisions the manufacturing scheduler might use a Constrained MRP (CMRP) software application. We now describe how the framework can be used to develop such an application. CMRP categorizes procured parts as being constrained or unconstrained. Additional unconstrained parts can be obtained by purchasing them. The analyst-programmer could use the model that unconstrained parts are made from a budget. The amount of the budget consumed when procuring a part is the purchase price. The analyst-programmer conceptualizes CMRP by adding another level to the bill-of-manufacturing (BOM) which has a single part called the budget. The unconstrained parts have a BOM are connecting them to the budget. This are denotes that an unconstrained part is realized by consuming some of the budget part. The supply of the budget part is equal to the amount of money the manufacturing scheduler has available to procure additional parts.

With this model the solver will provide a production schedule for the unconstrained parts. The programmer analyst recognizes that the production schedule corresponds to the manufacturing scheduler's procurement of unconstrained parts.

The framework can now be extended by the analyst-programmer to develop the CMRP application by modifying the behavior of the IPP class in the following way:

1. Create a budget part in the solver with a supply volume equal to amount of money available for part procurement.
2. Unconstrained parts are passed to the solver as if they were manufactured from the budget part. The amount of the budget part consumed is equal to the procurement cost and the cycle time is set to the procurement lead time.

In order for the application to communicate with the manufacturing scheduler in convenient way, the application must be able to distinguish between constrained and unconstrained parts. The framework accommodates this by augmenting the scenario object to have additional data, namely a set of constrained parts and another set of unconstrained parts. These two ASOP objects are defined by IPP.

The Scenario SchedFact has additional behavior added to it which allows the user interface to obtain schedules of part attribute data for constrained and/or unconstrained parts.

The CMRP application can now be developed by making new subclasses of IPP, Scenario, and SchedFact. All other code including the DIF and solver can be reused as is. The framework has separated the components of the application into orthogonal pieces. This allows new applications to be developed by making very local and isolated changes to an existing framework application. The benefits are that new applications can be developed more quickly and at a higher quality than before with the prior art.

Extending to Handle Another MIS system

The framework uses a DIF for communicating with the MIS system. The DIF is responsible for obtaining domain-specific objects and this attributes. For example, in the CMRP application the DIF is responsible for providing the procured material parts and the attribute value which indicates if the part is constrained. When the CMRP application is used with a new MIS system, the methods which implement these responsibilities can be replaced with new methods that provide this function for the new MIS system.

This allows framework applications to be reused with different MIS systems by using a DIF specialized to the particular MIS system. This level of reuse allows existing applications to the more easily deployed in a new MIS environment than before with the prior art.

Figure 5:
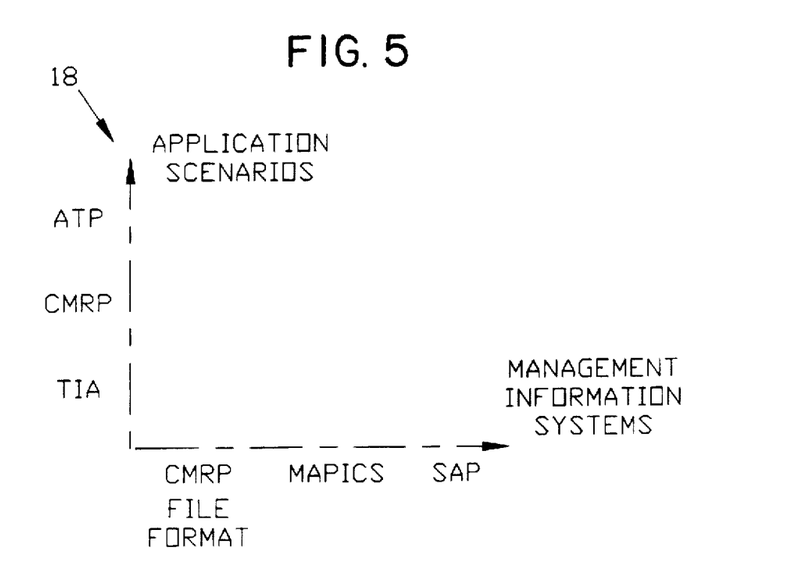
FIG. 5 shows the orthogonality of application and MIS.

The orthogonality between the DIFs and the application code is shown in FIG. 5, numeral 18. The vertical axis is for applications. TIA is an application that considers all materials and capacities to be constrained and produces an optimal feasible production plan. CMRP is the application described above. ATP is an application that helps planners or order-takers do order promising (as described in the APICS dictionary). These are examples of applications; there are many others. The horizontal axis is for MISs. CMRP file format is a file format that can be used if the company using the applications does not have a true MIS, of if the application has to run without using an MIS. (This might occur during development or testing). MAPICS is an popular MRP that runs on IBM minimcomputers. SAP is a popular ERP that uses client-server technology and runs on a variety of computers. There are many other MISs.

The figure shows that the many applications can use the same DIF, and that the same application can use different DIFs. We now provide a detailed description of the framework.

Level 3—Implementation Details

DIF Each DIF is responsible for obtaining the domain-specific objects and their attributes from an MIS being used by a framework application. In addition, if an MIS is capable of representing more than one set of data at a time (such as an MIS that can represent two independent companies' businesses at the same time), the DIF is responsible for knowing which set of data is to be used by the application. The domain-specific objects used as material parts, capacities, demands (orders), and BOM arcs. Each of these objects have attribute data associated with them. For example, a demand attribute might be the revenue associated with shipping one unit of product to that demand. (See WIT Workstation Implosion(TM) Tool, User and Reference Guide for more examples of attribute data). The DIF is used by the rest of the framework, especially the Application Subsystem.

A DIF has a table which stores the type of domain specific objects and attributes it supports. This allows the rest of the framework to query the DIF to determine if an attribute which is needed by a specific application is available. If a needed attribute is not available then the rest of the framework can take suitable alternate action. The table also contains a pointer to a function which carries out the DIF responsibility of obtaining the domain-specific objects and their attribute values. The DIF uses the function pointers to call functions to get the data the rest of the framework requests.

The scheme can also be used by an DIF to allow the framework to put data (such as modified input and new output) into the MIS.

Because new applications may need to be able to use attributes that were not anticipated by the logistics framework designers, new attributes can be added to the set of attributes a DIF is able to access. For example, if an application needs to known the "reflectivity" of a material (an attribute not normally used in logistics applications) the DIFs that the application uses could be augmented to provide reflectivity (assuming that it could be found in the relevant enterprises' MISs). This extension is easily accommodated by adding entries to the table containing the attribute-function pointer pairs for the DIFs in question. The DIF is also responsible for putting all parts and demands into the USOP and USOD respectively.

Because of the flexibility required of the DIF subsystem, it is designed as a subframework. It uses the Bridge pattern (Gamma, et al, 1995).

USOP The responsibilities of USOP are:

Hold a sequenced set of all of the parts.

Provide a technique for iterating through the set of parts.

Provide a mapping from the user view of the part (typically a part-name of part-number) to the part.

USOD The set of demands is analogous to USOP with the exception that the set contains demands rather than parts.

IPP the IPP has an association with a DIF, a WP, and an LPS. The IPP has responsibility for implementing the problem p, the mapping $m_2$, and the mapping I in a way that the solver can be used to obtain a solution. The IPP obtains the domain-specific objects and their attributes from the DIF. This is used in the formulation of p, which is provided to LPS.

The IPP is also responsible for initializing any Application Set of Parts (ASOPs) and Application Set of Demands (ASODs) which might be used by a schedule for reporting the solution in a meaningful way to the user, or might be needed by the application logic.

EXAMPLES

An application might have to report the solution grouped by demand category, so each category could be kept in a different ASOD.

An application's logic might need to keep track of different categories of capacity in order to allocate capacities differently (based on category), so the capacities in each category could be kept in a different ASOP.

LPS The LPS object is responsible for encapsulating the solver. In our CMRP example, the solver we used was WIT. Although IPP and methods in the scenario object do the mapping $m_2$, LPS is responsible for passing data to the solver. LPS must also be able to invoke the solver to find a solution, and then respond to queries about the solution. LPS provides the means for querying and modifying the solver's input data. This allows the framework user to try alternative solutions after viewing an existing solution. The modifications of the input data is done by querying a WP for the latest values.

When LPS is asked to find a new solution, it first queries WP to insure that the data used for the new solution contains the users most recent changes.

WP WP is responsible for maintaining the original and most recent version of data that is input to the solver, and can be changed by the framework after it has been put into the solver for the first time.

When the framework wishers to known about the problem being solved or its solution, it is the responsibility of WP to provide this information. (If WP does not known the current value because it has not been changed, WP asks LPS for the value.) When the user wishes to change some data associated with the current problem being solved, this data is passed to WP. As long as a data item in WP is different from the original value which was put into the solver by IPP, this data will be kept in WP. (It may be kept even if it is changed back to the original value.)

SortSched The responsibilities of SortSched are:

1. Hold a sequenced set of items (parts or demands) and an attribute value associated with the item.
2. Provide a mapping from the user view of the item, typically a part-name or demand-name to the item.
3. Provide a technique for iterating through the items in the schedule.
4. Provide a method for sorting and filtering the schedule.
5. Support communication links with the WP and the LPS to have the attribute values updated if they change in the framework.
6. Propagate any attribute data value change to the WP when the user changes a value. Because the SortSched has complicated responsibilities and must be flexible, it is designed as a subframework and makes heavy use of the Strategy pattern (Gamma). Further details on a suitable and preferred sorting schedule are disclosed in a commonly assigned U.S. patent application Ser. No. 08/504,626, incorporated by reference herein.

SchedFact This class is responsible for creating a sortSched when provided with a schedule descriptor which uniquely defines the desired schedule. Derived subclasses implement the code to handle application-specific cases. Using the schedule descriptor, the SchedFact knows the correct SOP (or SOD) to be used in the SortSched and how the SortSched is to be sorted and filtered.

Scenario Each Scenario object contains the above objects. It may also contain other objects needed by the application (such as a finite state machine) and other logic needed by the application (such as logic for manipulating the state machine). Each scenario object contains a DIF object so that the scenario can use the DIF and so that the scenario object can be copied. Note, however, that the DIF subsystem is not part of the Scenario subsystem. This is because the data source and destination should be kept separate from each application's data and logic.

Implementation

Machine Realization of the Present Invention

Figure 6:
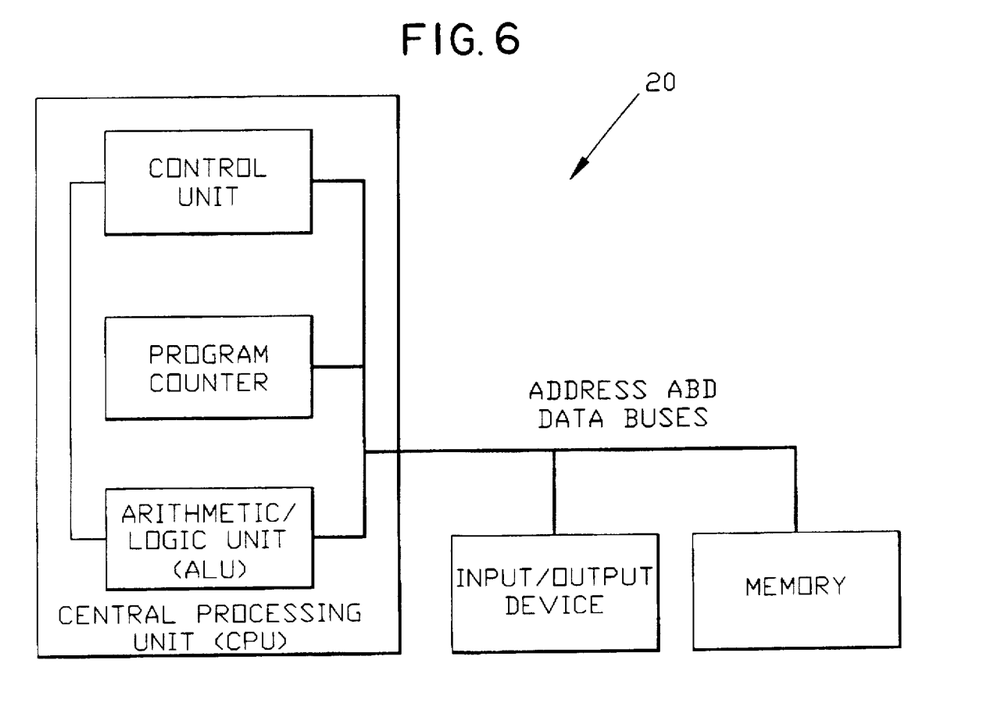
FIG. 6 shows a schematic of a canonical CPU.

The class of computers known as Von Neuman computers comprise a memory, a bus, zero or more input/output devices, and a processing unit containing an arithmetic/logic unit, a control unit, and a program counter. The program counter may be considered to be part of the control unit. The bus connects the memory, the input/output (I/O) devices, and the control unit. (See FIG. 6, numeral 20).

The memory contains storage locations that have addresses. The addresses are usually numerical. Data at each storage location can be read and, usually, written. Every Von Neuman machine has some memory that can be written, while some of the memory may be read-only. Preferably, the tool of the present invention is stored in memory.

The bus is able to represent the address of a memory location, the contents of a memory location, and whether the memory location is to be written or read. It may also be able to represent conditions such as changes in the status of I/O devices.

The I/O devices are able to receive instructions via the bus, are able to send status information via the bus, and are able to receive data from the bus and write data on the bus when signaled to do so by the bus. The I/O devices may be able to control the bus, but this is not required. Input devices are able to read data stored in the devices or read from external media and place that data on the bus. Output devices are able to write data from the bus to storage in the device or to external media. Some I/O devices are able to do both.

The processing unit (which may also be referred to as a central processing unit, CPU, or microprocessor), contains an arithmetic/logic unit, a program counter and a control unit (which may also be referred to as an instruction unit). The control unit is what distinguishes Von Neuman computers from calculators. The mathematical solver of the present invention is typically executed by the arithmetic/logic unit.

The processing unit is able to put addresses on the bus, read data from the bus, and write data to the bus. In this way, the processing unit is able to cause data to be read from specified memory locations or I/O devices or write data to specified memory locations or I/O devices.

The processing unit is able to read data from memory locations and treat the data as instructions that control the actions of the control unit and arithmetic/logic unit. At any point in time after the initialization of the computer, the program counter will contain the address of a memory location. In the computer's Instruction Cycle, the processing unit will read the instruction stored at the location specified by the program counter, increment the address in the program counter so that it contains the address of the instruction in memory that follows the instruction just read, and execute the instruction just read.

The processing unit generally has a relatively small amount of storage which can represent the contents of one or more memory locations. This storage is referred to as the register or registers.

The instruction can cause any of the following to happen:
read data from memory or an I/O device into a register;
write data from a register to memory or an I/O device;
perform an arithmetic or logic calculation using data in one or more registers and/or (optionally) memory locations or I/O devices and writing the result to a register or (optionally) memory location or I/O device;
cause the contents of the program counter to be changed, optionally storing the previous value in a register or memory;

Whether the contents of the program counter are changed can be based on the result of an arithmetic or logical calculation or based on a value in a register. This allows different sequences of instructions to be executed.

Figure 7:
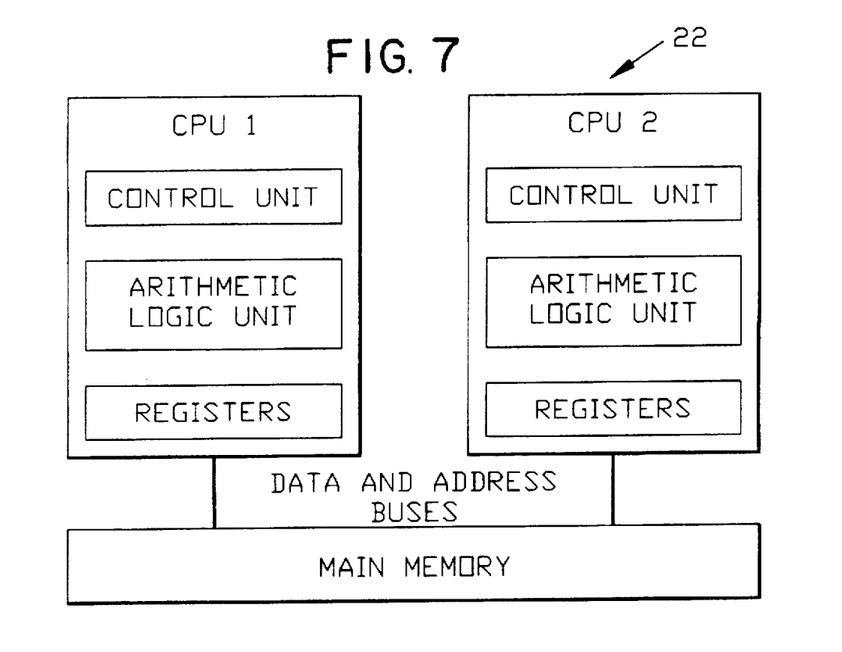
FIG. 7 shows a schematic of multiple independent CPUs.

This describes the fundamental properties of a Von Neuman computer. Many extensions are possible. For example, there may be instructions that read and write memory in one instruction cycle. There may be multiple buses. The I/O devices may be able to take control of the bus (or buses) and read or write data from or to the memory without the processing unit's intervention or assistance. The processing unit may be able to fetch and execute multiple instructions concurrently while providing the abstraction that only one instruction is executed at a time. The computer may provide a virtual memory abstraction, meaning that virtual addresses are mapped to different physical addresses in the memory, allowing programs to use more memory addresses than the computer has in physical memory. See FIG. 7, numeral 22.

The Von Neuman computer is sometimes referred to as a Single Instruction Single Data computer because, at least in the abstract, it executes one instruction at a time and does zero or one arithmetic/logic calculations at a time.

Figure 8:
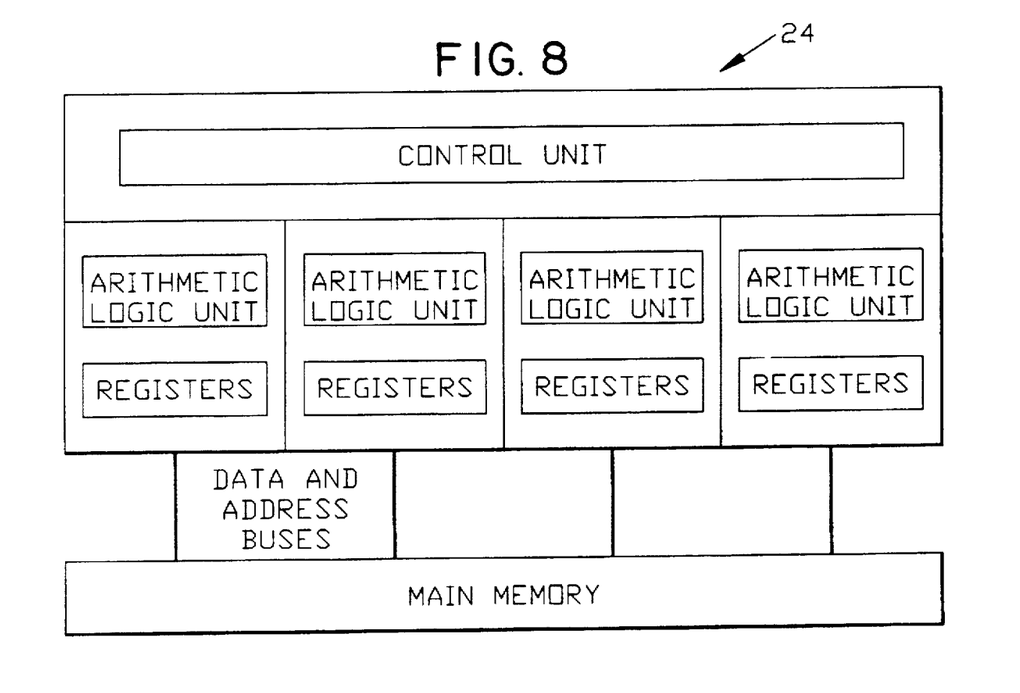
FIG. 8 shows an array processor.

Other computer architectures take the Von Neuman architecture and extend it by adding arithmetic logic units or whole processing units. See FIG. 8, numeral 24.

Single Instruction Multiple Data (SIMD) machines execute one instruction at a time (at least in the abstract), but each instruction can cause the same calculation to be done (using data from different registers and/or memory locations) in many different arithmetic/logic units.

Figure 9:
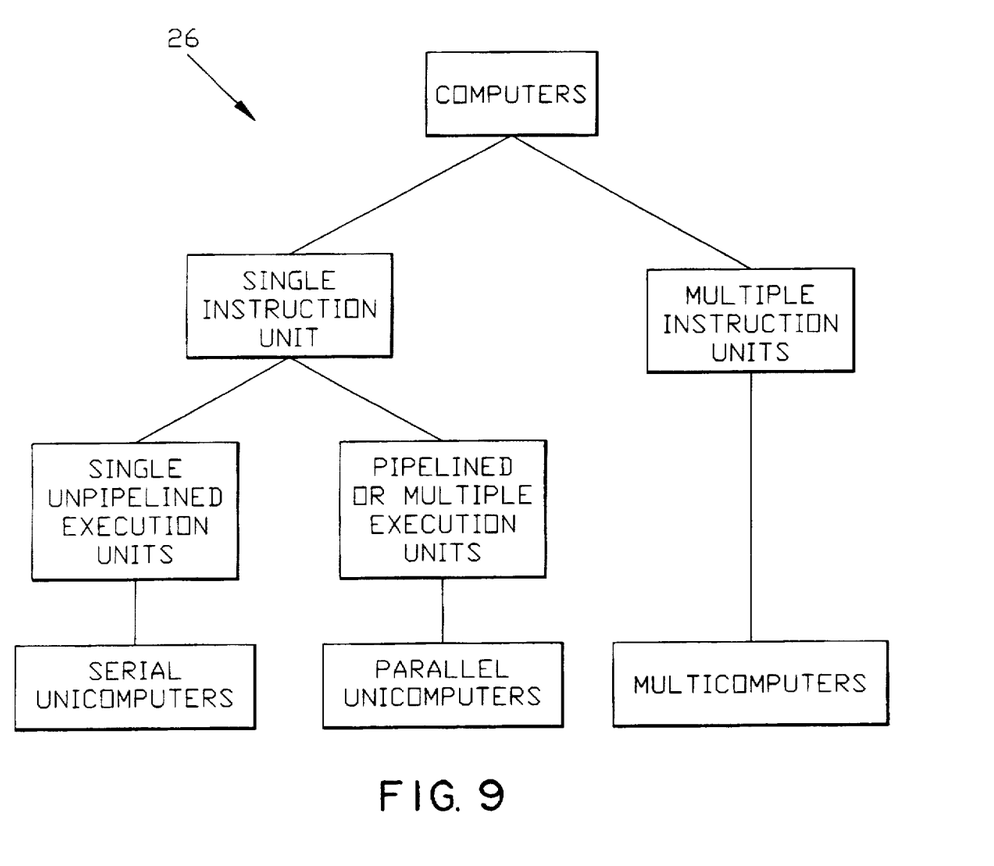
FIG. 9 shows a taxonomy in computer architecture.

Multiple Instruction Multiple Data (MIMD) machines have many processing units and are able to execute many different instructions at the same time. See FIG. 9, numeral 26.

What is claimed:

1. A tool including a framework suitable for manufacturing logistics decision support, the tool comprising:
   (1) means for providing an object-oriented technology framework, the framework comprising:
      (i) means for defining objects representing manufacturing logistics problems; and
      (ii) means for transforming a subset of the above objects into representations commonly used in mathematical solvers, wherein the representations in the solver have predefined relationships based on their properties; and
   (2) means responsive to selective changes in the objects for modifying the behavior of the framework for developing a new manufacturing logistics decision support application.

2. A tool according to claim 1, wherein the means for defining objects comprises object-oriented analysis for implementing objects and/or classes.

3. A tool according to claim 2, including means for defining objects comprising a problem in the manufacturing logistics area of manufacturing businesses that is amenable to algorithmic solution.

4. A tool according to claim 1, wherein the mathematical solver comprises means for manipulating symbols in a mechanical way using an algorithmic technique for finding answers to problems represented by configurations of the symbols.

5. A tool according to claim 4, wherein the means for transforming a subset of the above objects into representations commonly used in mathematical solvers comprises:
   (i) means for converting the relevant objects' relevant attributes into the representations of the solver being used;
   (ii) means for converting member function calls that can operate on the objects into invocations of the solver; and
   (iii) means for converting output from the solver into changes in the relevant objects' relevant attributes.

6. A tool according to claim 1, wherein the means for developing a new manufacturing logistics decision support application comprises:
   (i) means for analyzing and modeling a manufacturing logistics problem;
   (ii) means for designing an application representing the model and responsive to external controls of the application; and
   (iii) means for implementing the application as designed.

7. A program storage device readable by a machine, tangibly embodying a program of instructions executable by the machine to perform method steps comprising:
   (1) providing an object-oriented technology framework, the framework comprising:
       (i) means for defining objects representing manufacturing logistics problems; and
       (ii) means for transforming a subset of the above objects into representations commonly used in mathematical solvers, wherein the representations the solver have predefined relationships based on their properties; and
   (2) responding to selective changes in the objects for modifying the behavior of the framework for developing a new manufacturing logistics decision support application.

* * * * *